F. TSCHUDY.
CRACKER PIPE FOR SATURATING APPARATUS.
APPLICATION FILED SEPT. 21, 1914.
1,135,472.
Patented Apr. 13, 1915.
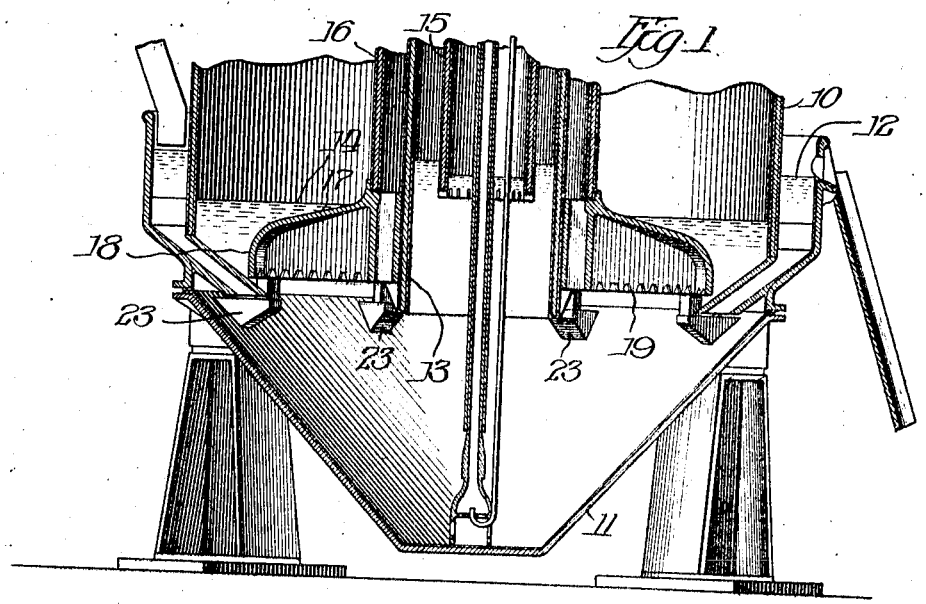
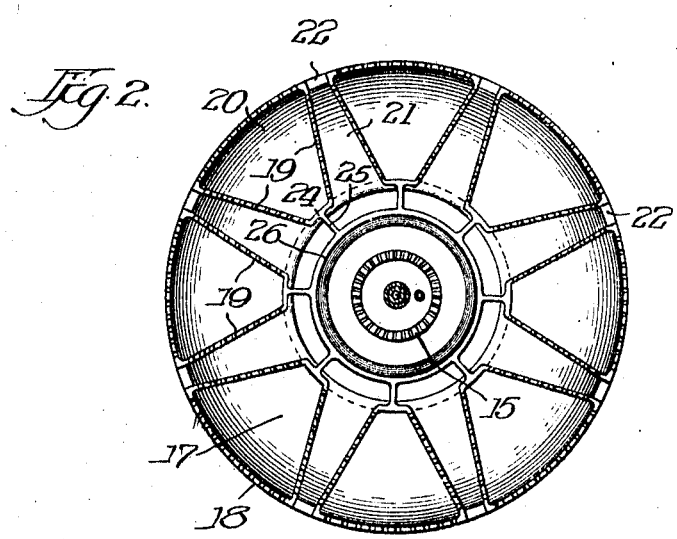

UNITED STATES PATENT OFFICE.

FREDERICK TSCHUDY, OF BIRMINGHAM, ALABAMA.

CRACKER-PIPE FOR SATURATING APPARATUS.

1,135,472.

Specification of Letters Patent. Patented Apr. 13, 1915.

Application filed September 21, 1914. Serial No. 862,834.

*To all whom it may concern:*

Be it known that I, FREDERICK TSCHUDY, a citizen of the United States, and resident of Birmingham, in the county of Jefferson and State of Alabama, have invented certain new and useful Improvements in Cracker-Pipes for Saturating Apparatus, of which the following is a specification.

My invention relates to cracker pipes or dippers used for splitting up gases or vapors into small globules when immersed in saturating solutions.

In the process of forming salts, sulfates, sulfids, and the like from gases, vapors, etc., by immersion or passing of such gases through chemical solutions it is essential that such gases should be divided into as small portions or globules as possible so that the chemical solution may reach all of the components to be acted upon. When working an apparatus under comparatively high pressure, gases will pass very rapidly through the solution, so that the chemical reaction must be almost instantaneous in order to result in a complete extraction of the desired product. For this reason, in the extraction of valuable products, the gases are sometimes re-treated by passing them through a second and separate solution, thus subjecting them to another splitting up and a second contact with the chemical solution. Most all cracker pipes now in use are of annular shape some with serrated edges, others take the shape of full or semi-circles, with openings for egress of gas on both sides of the hollow circle; still others are circular pipes perforated on the sides or bottom. In all cases the gas, even if finely divided, rises rapidly through the solution with but one contact of the globule with the saturating medium, whatever the size of this globule may be. Furthermore, the reaction of the saturating fluid in all these cracker pipes is localized to the periphery of the various shapes, or pipes used, and consequently the reagent at these points is weak, while at other points in the saturator vessel the solution remains inactive at its full strength. By setting the openings in the cracker pipe at an angle, an attempt is made to use the gas pressure to give the solution rotary motion, in order to keep the strength of the bath more uniform. It is practically demonstrated that this circular motion is broken by the surge of the solution, due to pressure differences in the gas supply and that it does not accomplish its designed purpose.

My invention will be more readily understood by reference to the accompanying drawings, wherein, Figure 1 is a sectional elevation of the lower portion of a saturator showing my novel cracker pipe, and, Fig. 2 is a bottom plan view of the cracker pipe.

Referring more particularly to the drawings, it will be seen that a saturator may consist in a shell 10, provided with a hopper-like bottom 11, and a liquid seal 12. Concentrically disposed within the shell is a division wall 13, extending a substantial distance below the level 14, of the acid bath. Within this wall or cylinder a conduit 15, is located by means of which vapors from a still are directed into the bath. Outside of the wall 13, is another cylinder 16, within which the gases to be treated are conducted. The conduit or cylinder 16, terminates at its lower end in a cracker pipe or device for splitting up or scrubbing gas. This cracker pipe in the present instance consists in a series of chambers covered at the top by means of a wall 17, having a down-turned outer edge 18, the bottom of which is serrated as shown in Fig. 2. Walls 19, extend inward from the edge 18, and form chambers 20, 21. The outer edge of the chamber 21, is closed by means of the leg 22, which leg has the added function of supporting the cracker pipe on the brackets 23. These legs prevent the passage of gas at that point. The chambers 21, are open at their inner ends to the conduit 16, and gas passing down said conduit enters first the chamber 21, and passes beneath the serrations on the lower edge of the walls 19, into the chamber 20. Thus the gases pass beneath the lower edge of the wall 18, thence upward through the acid. The walls 19, converge at 24, and are connected by a web 25, to an inner cylinder 26, which fits snugly around the wall 13. The walls 19, form the primary cracker pipe and the wall 18, the secondary cracker pipe. By this construction the gases are twice subjected to a subdivision and the splitting and scrubbing action is doubled.

I claim:

1. In a cracker pipe, the combination of a cover, substantially radial walls extending downward from said cover, said cover having a downwardly projecting outer edge whereby a plurality of chambers is formed, one series of chambers being open to the axial center of the device but closed at the periphery thereof whereby gases are compelled to pass beneath two walls, substantially as described.

2. In a gas cracker pipe, a cover having a downwardly projecting outer edge, radial walls forming chambers open at the bottom one series of chambers being open to the axial center of the device, another series of chambers being closed to said center, substantially as described.

3. In a cracker pipe, the combination of a cover having a down-turned peripheral flange, substantially radial walls extending downward from said cover and forming a series of substantially triangular chambers open to the bottom, substantially as described.

4. A cracker pipe, consisting of walls forming a series of chambers radiating from a central supply pipe, and provided with serrated edges for the purpose of splitting up the gases, the ends of the radiating chambers being closed to prevent the passage of gas, substantially as described.

5. A cracker pipe, consisting of walls forming a series of chambers radiating from a central supply pipe, a wall connecting the ends of the radial chambers, serrated at the bottom edge and forming a series of outside chambers for the purpose of resplitting the gases escaping from the radial chambers, substantially as described.

FREDERICK TSCHUDY.

Witnesses:
W. GRANT HARBISON,
M. M. HUGHES.